(12) United States Patent
Sunshine

(10) Patent No.: US 11,570,247 B2
(45) Date of Patent: Jan. 31, 2023

(54) RESILIENT DISTRIBUTED STORAGE SYSTEM

(71) Applicant: Goodblock Technologies, Inc., Issaquah, WA (US)

(72) Inventor: Stephanie Marie Sunshine, Seattle, WA (US)

(73) Assignee: GOODBLOCK TECHNOLOGIES, INC., Issaquah, WA (US)

( * ) Notice: Subject to any disclaimer, the term of this patent is extended or adjusted under 35 U.S.C. 154(b) by 0 days.

(21) Appl. No.: 17/093,395

(22) Filed: Nov. 9, 2020

(65) Prior Publication Data

US 2021/0258380 A1 Aug. 19, 2021

Related U.S. Application Data

(60) Provisional application No. 62/933,248, filed on Nov. 8, 2019.

(51) Int. Cl.
*H04L 67/1097* (2022.01)
*H04L 67/02* (2022.01)
*H04L 67/1017* (2022.01)
*H04L 67/01* (2022.01)

(52) U.S. Cl.
CPC .......... *H04L 67/1097* (2013.01); *H04L 67/01* (2022.05); *H04L 67/02* (2013.01); *H04L 67/1017* (2013.01)

(58) Field of Classification Search
USPC ........................................................ 709/217
See application file for complete search history.

(56) References Cited

U.S. PATENT DOCUMENTS

| 2006/0129665 | A1* | 6/2006 | Toebes | H04L 67/1008 |
| | | | | 709/223 |
| 2011/0138075 | A1* | 6/2011 | Fein | H04L 67/1097 |
| | | | | 709/245 |
| 2012/0198075 | A1 | 8/2012 | Crowe et al. | |
| 2012/0207151 | A1 | 8/2012 | Alt et al. | |

(Continued)

OTHER PUBLICATIONS

Dong, Content Caching in Networks with Storage, rutgers.edu, May 2011 (116 pages) (Year: 2011).*

(Continued)

*Primary Examiner* — Wing F Chan
*Assistant Examiner* — Leon Y Tseng
(74) *Attorney, Agent, or Firm* — Perkins Coie LLP

(57) ABSTRACT

A distributed data storage system that includes endpoint nodes, gateway nodes, and one or more gateway name servers. A gateway name server receives from clients resolution requests to resolve to a gateway node and resolves the resolution requests to a gateway node address of a gateway node. A gateway node receives client requests to access an endpoint node and redirects the requests to endpoint nodes identified by a gateway node whose address was resolved to by a gateway name server. An endpoint node receives from a client a retrieval request to retrieve data based on being redirected to the endpoint node. When a retrieval request is received and the endpoint node stores the data, the endpoint node sends the data to the client. When a retrieval request is received and the endpoint node does not store the data, the endpoint node forwards the retrieval request to another endpoint node.

17 Claims, 12 Drawing Sheets

(56) References Cited

U.S. PATENT DOCUMENTS

2012/0226712 A1  9/2012  Vermeulen et al.
2017/0346900 A1  11/2017  Baptist et al.

OTHER PUBLICATIONS

International Search Report and Written Opinion for International Application No. PCT/US20/59731; dated Feb. 10, 2021; 10 pages.

* cited by examiner

RESILIENT DISTRIBUTED STORAGE SYSTEM

CROSS-REFERENCE TO RELATED APPLICATION

This application claims the benefit of U.S. Patent Application Ser. No. 62/933,248 filed on Nov. 8, 2019, which is hereby incorporated by reference in its entirety.

BACKGROUND

The modern computing world is increasingly moving from organizations storing their electronic data on their own computer equipment to storing data and performing computations on computers owned by data center operators referred to as cloud computing. Cloud computing is growing rapidly and dominated by a limited number of large companies. Although these companies are generally reliable as centralized entities, they present a single point of failure for any company that relies on their services. The centralization of these computing resources also presents other potential exploits with undesirable outcomes for most stakeholders. For example, a server in a data center may be infected with ransomware (e.g., a type of malware) that exploits a security flaw in the supervisory software that provides overall control of the data center. The ransomware may propagate to other servers and encrypt data that is accessible to those servers using an encryption key. The encrypted data cannot be used by the server until a ransom is paid in exchange for a decryption key that can be used to decrypt the encrypted data.

One approach to removing the single point of failure presented by centralized cloud computing data repositories is decentralized data storage. Decentralized data storage stores data on different computers distributed across geographic areas and organizations so that no one entity presents a single point of control either for the availability of data or for the integrity of their contents. One open source software project that has sought to provide decentralized data storage is the Inter-Planetary File System (IPFS).

Although IPFS is considered by many to be an improvement over prior decentralized data storage, implementations of IPFS have had problems. One problem is that access times are unpredictable because an access request may be routed to indeterminable number of data storage servers. Another problem is the inability to provide asynchronous forward replication of data to ensure data availability against failures.

DETAILED DESCRIPTION

Figure 1:
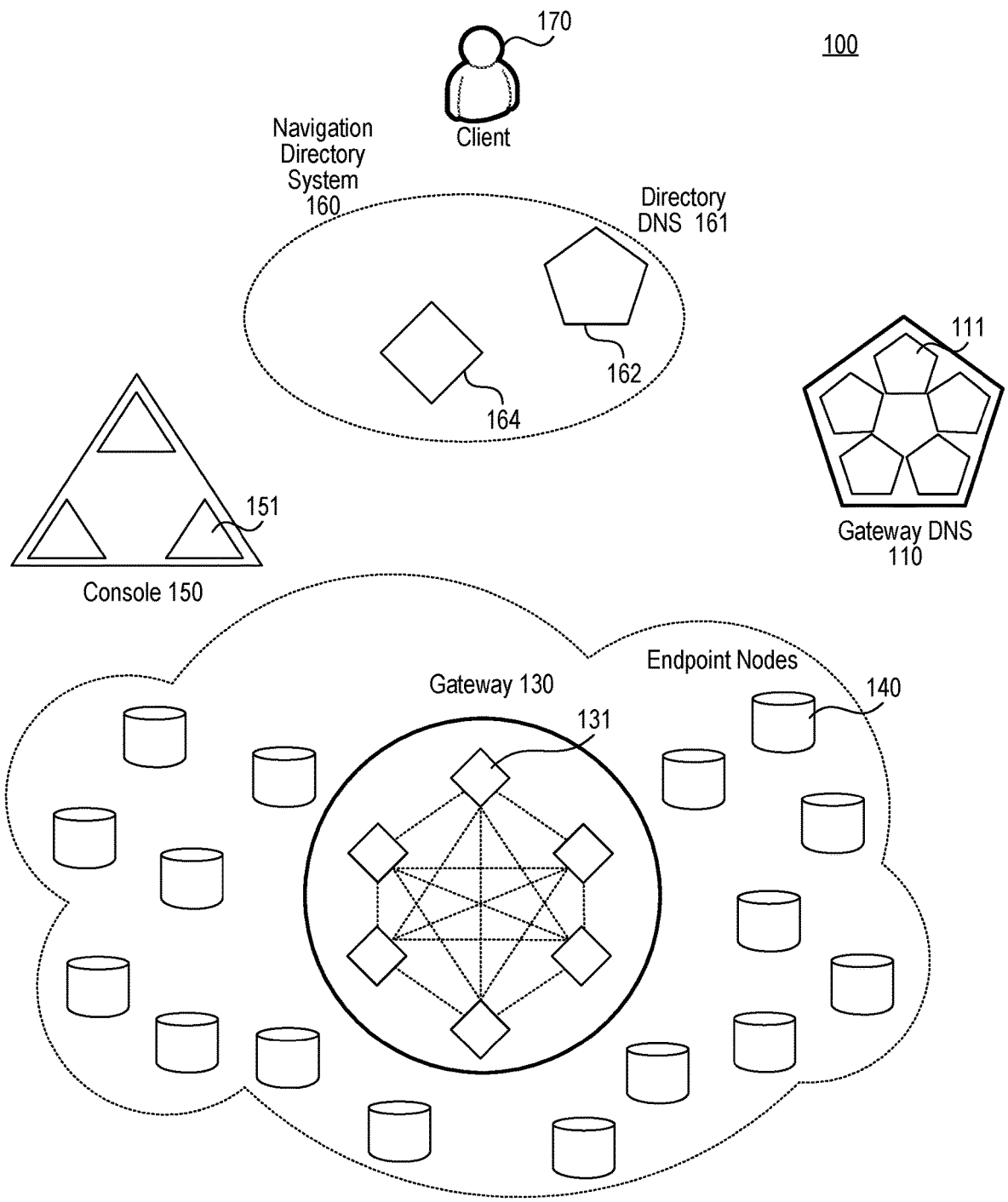
FIG. 1 is a block diagram that illustrates the overall architecture of the distributed storage system in some embodiments.

A system is provided that allows access to distributed storage of data and access to computer resources in a way that is resilient to a single point of failure. In some embodiments, a resilient distributed storage (RDS) system provides access to endpoint nodes of the RDS system that store files of the RDS system. The RDS system includes a gateway to the distributed storage system that includes a collection of gateway nodes. The gateway nodes form a self-healing mesh network which accepts incoming requests from clients for a route an endpoint node to service a request for a resource such as retrieve a file. These gateway nodes are discoverable using a public domain name system (DNS), referred to the gateway DNS. Each gateway node can be under control of an independent entity, and the self-healing mesh network eliminates any single point of failure. The gateway nodes redirect requests from clients (i.e., computer systems) to store and access data by responding, for example, with an HTTP redirect (30x) response to endpoint nodes that provide the resources. These redirect responses route the client to an endpoint node to service the request. Because HTTP sessions based on a redirect are lightweight, the gateway nodes are capable of handling large volumes of requests. The RDS system may be used with Round-Robin DNS (RRDNS) to help distribute the requests evenly among the gateway nodes.

The RDS system allows endpoint nodes to rapidly respond with a very low impact to their resources because they do not process information regarding network topographies. Instead, each endpoint node publishes to the gateway nodes at intervals information regarding its status and availability. Endpoint nodes communicate securely with gateway nodes using a secure file transport protocol (e.g., SSH). Endpoint nodes respond to HTTP requests using secure socket layer (SSL) certificates (issued by a certificate authority) after the endpoint nodes have been added to the RDS system.

Gateway nodes use the status and availability to create an endpoint table of the endpoint nodes and their geographic locations. The gateway nodes, which may each periodically retrieve and store an endpoint table, respond to HTTP requests and redirect the requests to an endpoint node based on an accessibility metric derived from the endpoint table. The accessibility metric may be based on proximity, resource usage, or other metrics. The gateway nodes may select endpoint nodes in a round-robin manner from a set of endpoint nodes that are most accessible. The round-robin manner helps prevent an endpoint node from being overwhelmed with requests for services.

To access data of the RDS system, a gateway node is identified using a gateway DNS that receives a request to access the gateway and responds with a gateway node address of a gateway node to service the requests. The RDS system may select a gateway node in a round-robin manner to help prevent overwhelming a gateway node or a subset of the gateway nodes. The gateway DNS maintain a gateway node round-robin DNS (RRDNS) pool of available gateway nodes.

When an endpoint node receives a request to retrieve a file, the endpoint nodes responds with the file if it is stored locally. If not stored locally, the endpoint node selects an endpoint node from a list of endpoint nodes and forwards the request to one of those endpoint nodes, which may further forward the request to another endpoint node if no longer stored locally. The file is eventually provided to the original endpoint node who forwards the file to the client.

The RDS system may allow clients to store files on endpoint nodes. A console, which is a collection of console nodes, enforces permission to access files based on an application programming interface (API) key or a blockchain account authorization token. To ensure that file is unique and does not already exist on the RDS system, the gateway uses an IPFS multihash function to define the lookup key of a file (or a portion of a file or database record) by a hash of its contents. The most common hashing algorithm for IPFS multihash is SHA-256 but other hashing algorithms may be used, and the algorithm used is denoted in the initial characters of the resulting hash. Because the lookup key is a hash of its contents, changing any part of a file will result in an entirely different hash.

In order to store a file within the RDS system, a client uploads the file to a console node. A console node serves as a management console for the account and data of each client. A console node also exposes an API that allows for streamlining of account manipulation. A console node is accessed via the gateway DNS using a console node RRDNS pool that is distinct from the gateway node RRDNS pool, along with a specific API key or account. The console node sends to a gateway node a request to store the file. The gateway node generates the hash of the file and provides the hash to the console to be forwarded to the client. The client retains this hash for future access to the file.

To store the file at endpoint nodes, the gateway node uses an asynchronous file replication algorithm and endpoint status information reported to it (e.g., periodically) by the various endpoint nodes to determine the number of copies of the file to create. The gateway node then randomly selects this number of endpoint nodes within the system and sends the command, using ProxMox or some similar tool, to these endpoint nodes to each make a local copy the file and add a retention flag for that file. The retention flag indicates that the file should be retained on ("pinned to") the endpoint node until the flag is cleared.

To delete a file, a client establishes a session with the console in the same manner as for adding (or storing) a file. Assuming the client has permission to delete the file, the client (via the console node) issues a request to a gateway node identified via the gateway DNS. The gateway node broadcasts the request to all endpoint nodes and all other gateway nodes to "unpin" the file by removing the retention flag associated with it. As each node undergoes its own independent garbage collection (e.g., periodically or when a garbage collection criterion is satisfied), it will remove the file.

The RDS system may also allow for the retrieval of files using user-friendly file names rather than using hashes. The hash of a file may be "Qm1dR4dGhNJKfl6o85jbBsflwfYgHHe3sdf518Pf1eGs4r," but a user may have created the file with the file name "mydocument.pdf." Moreover, because the file may be retrieved from different endpoint nodes each time it is accessed, the URL returned to client by the gateway DNS to identify the file may be "aa.rds.cloud/Qm1dR4dGhNJKfl6o85jbBsflwfYgHHe3sdf518Pf1eGs4r" on one access and "zz.rds.cloud/Qm1dR4dGhNJKfl6o85jbBsflwfYgHHe3sdf518Pf1eGs4r" on the next access. The user-friendly file name are provided via consistent URLs rather than URLs that vary from access to access such as "aa.rds.cloud" and "zz.rds.cloud."

To allow for user-friendly file names, the RDS system may provide a directory of files identified by their user-friendly names. To support providing if user-friendly URLs (e.g., with a consistent host identified and a non-hash file name), the RDS system provides a navigation system that includes a directory DNS with directory DNS nodes and a navigation directory with navigation directory nodes. The navigation directory maintains a mapping of hashes to user-friendly URLs.

To request access to a file, a client requests the directory DNS for an address of a navigation directory node. The directory DNS may be part of the gateway DNS. The client then requests a navigation directory node to retrieve the file identified by its HTTP persistent URL and filename. The navigation directory node looks up the filename and its associated hash requests the gateway DNS for the gateway address of a gateway node. The navigation gateway node then requests the file from the gateway node using HTTP request that includes the hash. The gateway node responds with an HTTP 30x redirect to a named endpoint node.

The RDS system may be used to direct client requests to endpoint nodes to help balance load, by reflecting requests using HTTP 30x responses to rapidly create routes in a manner that is less resource intensive and more resistant to overloading than traditional load balancers. A load reflecting system is comprised of gateway nodes organized in a lightweight reflector mesh for instant redirection to endpoint nodes the provide computer resources such files or services such as via APIs.

The load reflecting process begins with a client requesting a gateway node address from the gateway DNS. The client then sends a request to the gateway node to access an endpoint node by its HTTP address. The gateway node redirects the client to a named endpoint node to service the request.

When an endpoint node is to join the collection of endpoint nodes, the endpoint node registers with a console node. The console node verifies that the endpoint nodes is executing the correct version of the endpoint node software (e.g., using a secure enclave). Once verified, the console node sends to a gateway node a request to provide an authorization token for the endpoint node, receives from the gateway node the authorization token, and sends to the endpoint node the authorization token. The endpoint node uses the authorization token when communicating with a console node and a gateway node. Each endpoint node receives (e.g., periodically) from a console node a list of the endpoint nodes (i.e., a list of peers) to allow an endpoint node to select other endpoint nodes when forwarding data access requests. The gateway nodes also maintain a list of endpoint nodes. The console nodes may periodically ping the endpoint nodes to detect when an endpoint node may be down. Alternatively, the gateway nodes may alternatively ping the endpoint nodes.

Although described primarily in the context of storing files, the RDS system may be used to store data of any type of data organization. For example, the RDS system may be employed to store records of a database system and retrieve individual records.

FIG. 1 is a block diagram that illustrates the overall architecture of the RDS system in some embodiments. The RDS system 100 includes a gateway DNS 110, a gateway 120, endpoint nodes 140, a console 150, and a navigation directory system 160. The gateway DNS includes gateway name servers 111 that implement a domain name system (DNS) that provides domain name services that receives requests to resolve URLs to the gateway and returns the address of a gateway node. The gateway includes gateway nodes 131 that form a self-healing mesh that (1) redirects requests for some services to endpoint nodes and (2) coordinates the handling of other requests. The endpoint nodes store files of the RDS system. The console includes console nodes 151 that coordinate adding and deleting of files from the distributed storage system. The navigation directory system 160 includes a directory DNS 161 that includes directory name servers 162 and navigation directory nodes 164. The navigation directory DNS provides a mapping of user-friendly URLs to hashes of files and resolves requests for hashes based on their user-friendly URLs so that client 170 can use user-friendly names instead of hashes when accessing a file of the RDS system.

Figure 2:
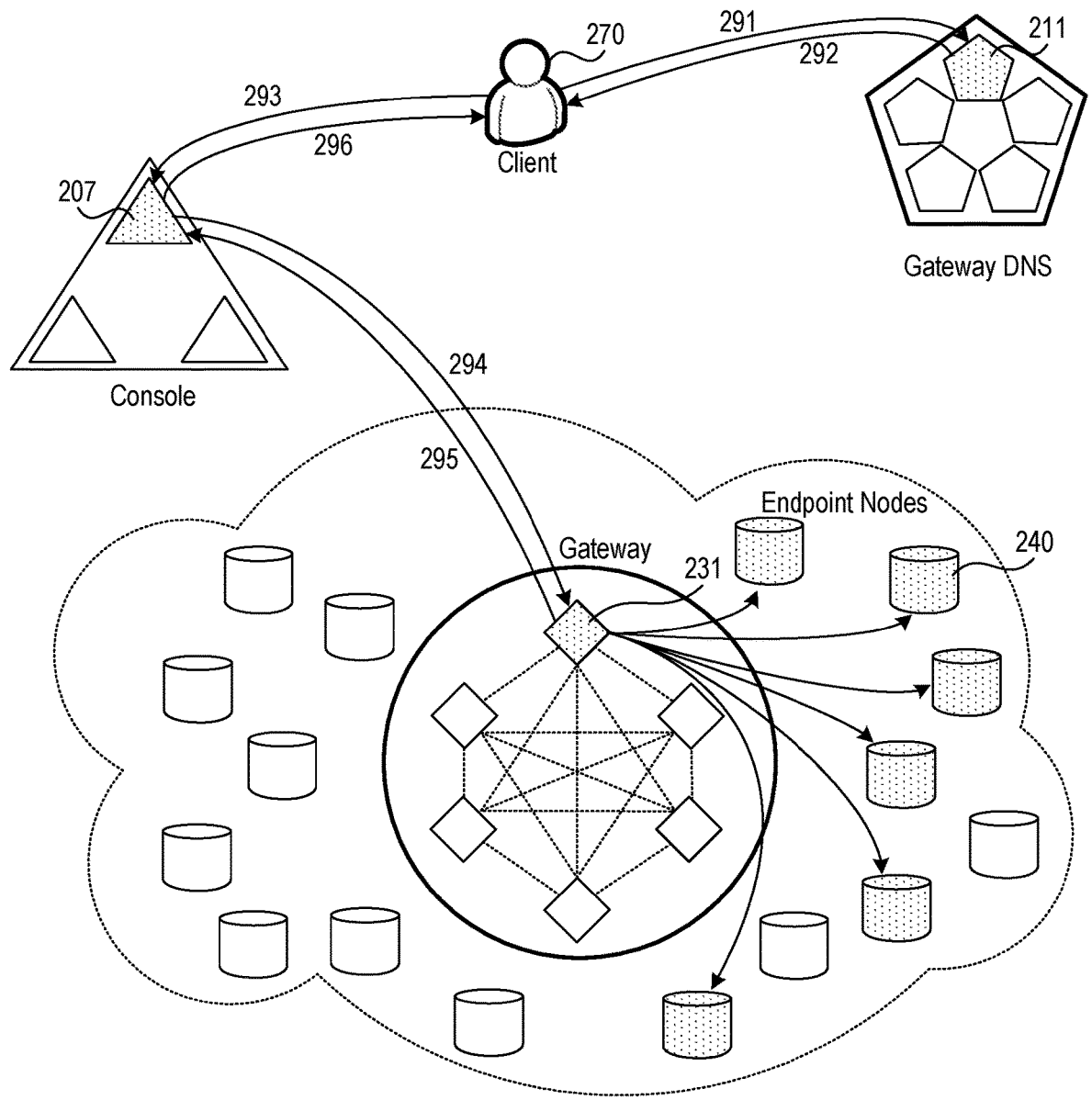
FIG. 2 is a block diagram that illustrates the addition of a file to the distributed storage system in some embodiments.

FIG. 2 is a block diagram that illustrates the addition of a file to the RDS system in some embodiments. A client 270 initially sends 291 to the gateway DNS a request to resolve a gateway identifier to a gateway node address. A gateway name server 211 returns 292 a gateway node address. The client establishes 293 a session with a console node 251 and provides the gateway address and the file that is to be added. Console node 251 forwards 294 the file to the gateway node address. A gateway node 231 generates a hash for the file and returns 295 the hash to console node 251. Console node 251 then forwards 296 the hash to the client (or a user-friendly URL generated by the navigation directory system) for use in subsequently identifying the file. Gateway node 231 also broadcasts the file and its hash to a set of endpoint nodes 240 for storage.

Figure 3:
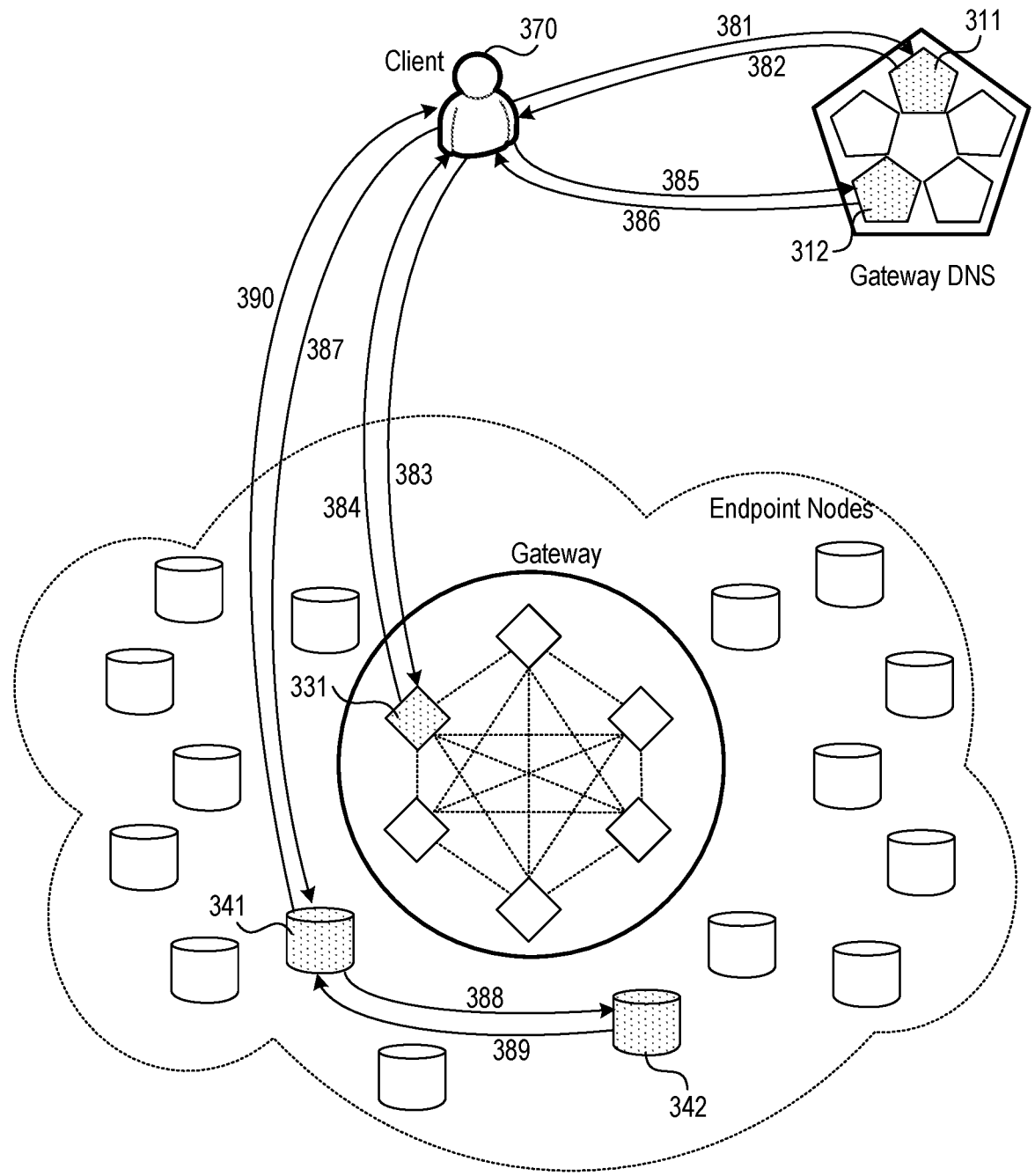
FIG. 3 is a block diagram that illustrates the retrieval of a file from the distributed storage system in some embodiments.

FIG. 3 is a block diagram that illustrates the retrieval of a file from the RDS system in some embodiments. A client 370 sends 381 to the gateway DNS a request to resolve a gateway identifier to a gateway node address. A gateway name server node 311 responds 382 to the request with a gateway node address. Client 370 sends to the gateway node address a retrieval request. A gateway node 331 identifies an endpoint name of an endpoint node 341 to service the request and redirects 385 the request to endpoint node 341. Client 370 sends 385 to the gateway DNS a request to resolve the endpoint name and receives 386 an endpoint address. The client sends 387 to endpoint node 341 at that endpoint address a request to retrieve the file identified by the hash. Endpoint node 341 determines whether it stores the file. If so, endpoint node 341 sends 390 the file to client 370. If endpoint node 341 does not store the file, it forwards 388 the request another endpoint node 342 determines whether it stores the file. If endpoint node 342 stores the file, endpoint node 342 sends 389 the file to endpoint node 341 which forwards 390 the file to client 370.

If endpoint node 342 does not store the file, it forwards the request to another endpoint node and the process is performed recursively or transitively until an endpoint node stores and provides the file.

Figure 4:
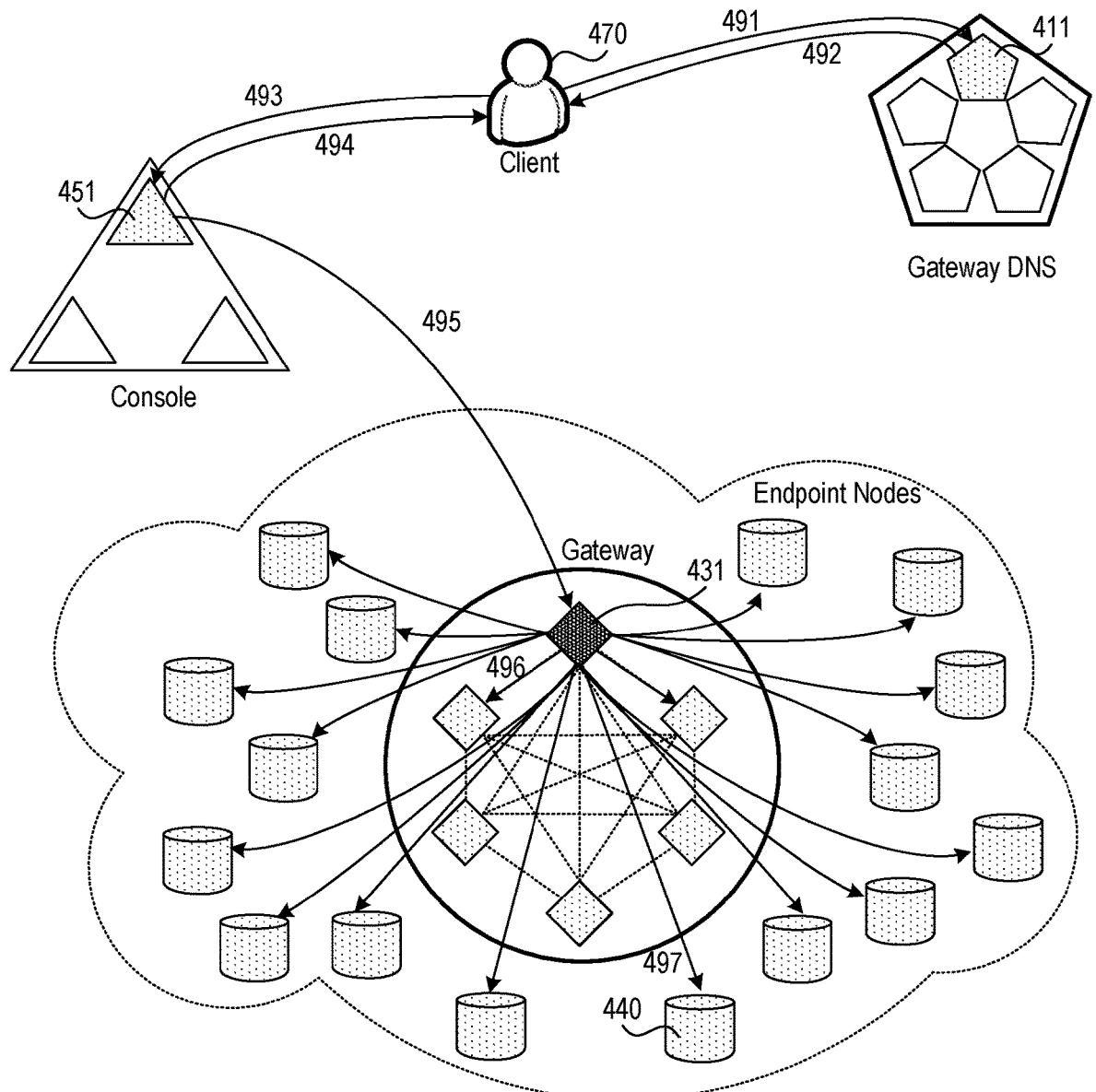
FIG. 4 is a block diagram that illustrates the deletion of a file from the distributed storage system in some embodiments.

FIG. 4 is a block diagram that illustrates the deletion of a file from the RDS system in some embodiments. A client 470 initially sends 491 to the gateway DNS a request to resolve a gateway identifier to a gateway node address. A gateway name server 411 returns 492 a gateway node address. Client 470 then establishes 493 a session with a console node 451 and requests the file identified by its hash to be deleted. Console node 451, after determining that client 470 has permission to delete the file, forwards 495 the request to gateway node 431 and returns 494 a confirmation to client 470. Gateway node 431 broadcasts 496 the request to all other gateway nodes and all endpoint nodes. The gateway nodes and endpoint nodes that store the file mark the file to be deleted. A gateway node may also act as an endpoint node for storing data.

Figure 5:
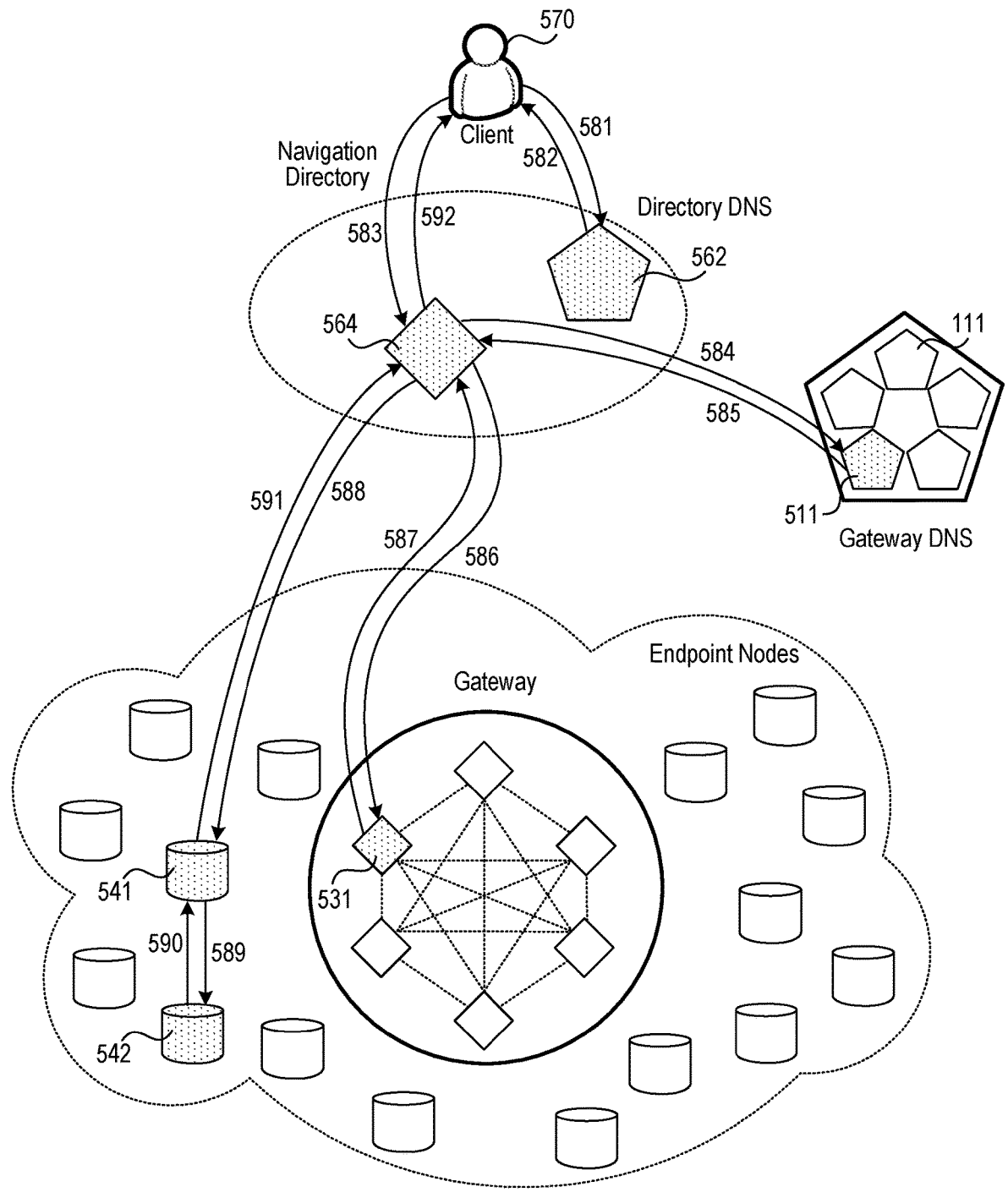
FIG. 5 is a block diagram that illustrates the accessing of a file using a user-friendly file name in some embodiments.

FIG. 5 is a block diagram that illustrates the accessing of a file using a user-friendly file name of the RDS system in some embodiments. A client 570 sends 581 to directory DNS 562 a request to resolve a user-friendly URL to a navigation directory address, and directory DNS 562 returns 582 the navigation directory node address. Client 570 sends 583 to navigation directory node 564 a request to navigate to an endpoint node. The navigation directory maintains a mapping of user-friendly file names to hashes. A navigation directory node 564 sends 584 to the gateway DNS a request to resolve a gateway identifier to a gateway node address. A gateway DNS node 511 returns 585 a gateway node address. Navigation directory node 564 sends 531 to a gateway node 531 (identified by the gateway node address) a request to retrieve the file identified by its hash. A gateway node 531 redirects 587 and 588 the request to an endpoint node 541. If endpoint node 541 stores the file, endpoint node 541 sends 591 the file to navigation directory node 564. Navigation directory node 564 forwards 592 the file to client 570. If endpoint node 541 does not store the file, endpoint node 541 forwards 589 the request another endpoint node 542 who determines whether it stores the file. If endpoint node 542 stores the file, endpoint node 542 sends 590 the file to endpoint node 541 which forwards 591 the file to client 570. Each endpoint node that receives a request sends the file if it stores it and forwards the request if it does not store it.

Figure 6:
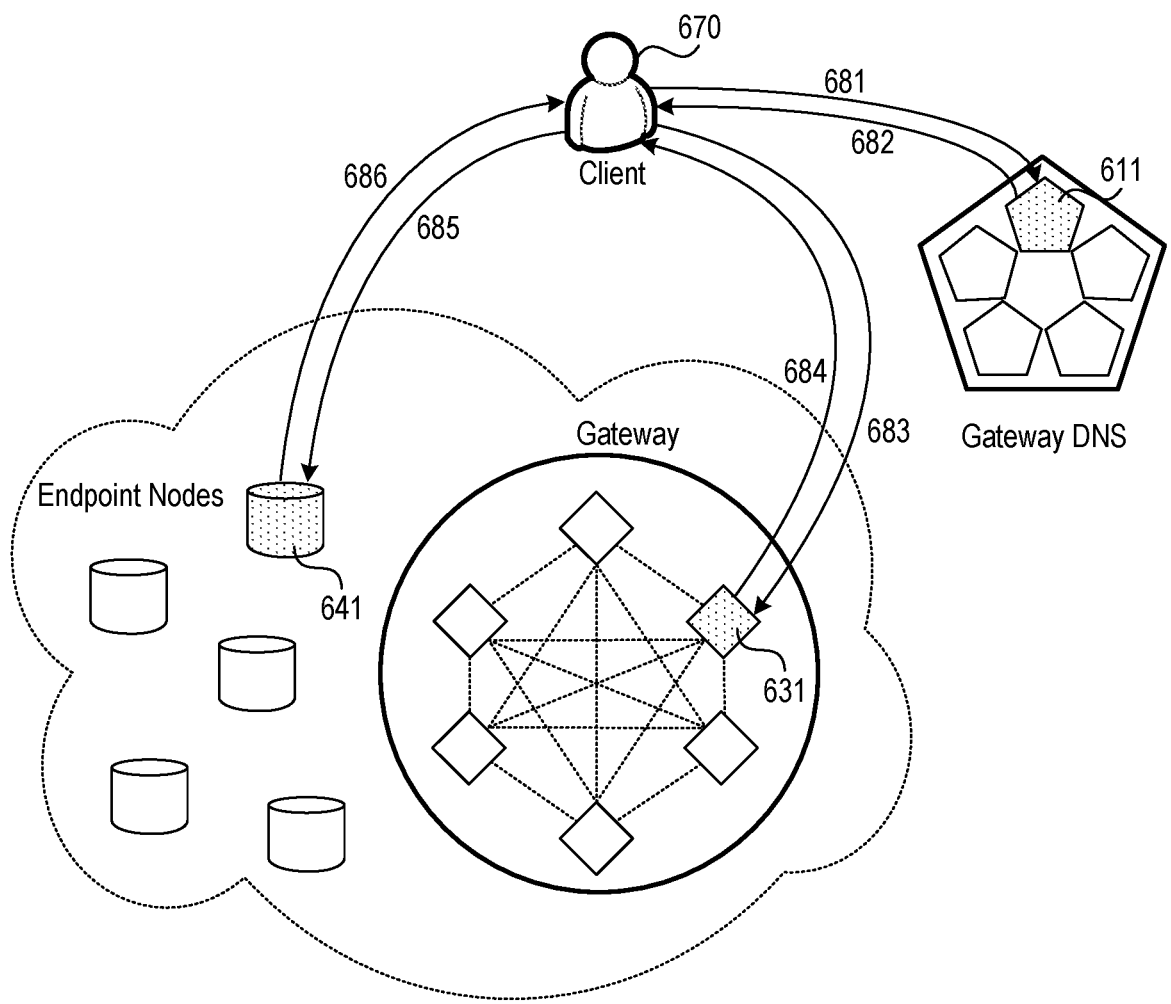
FIG. 6 is a block diagram that illustrates the reflecting of a request to access an endpoint node using the address of the endpoint node in some embodiments.

FIG. 6 is a block diagram that illustrates the reflecting of a request to access an endpoint node using an endpoint address in some embodiments. A client 670 sends 681 to gateway DNS a request to resolve a gateway identifier to a gateway node address. Gateway name server 611 responds 682 with a gateway node address. Client 670 sends 683 to a gateway node 631 a request to access an endpoint node 641 identified by a name of endpoint node 641. Gateway node 631 redirects 684 and 685 the request to endpoint node 641 that services the request. Endpoint node 641 then provides 686 to client 670 results of servicing the request.

In some embodiments, the RDS system employs an asynchronous forward replication algorithm and a geo-scale smart reflection routing algorithm. The asynchronous forward replication algorithm based on a formula that gateway nodes use to determine how many replicas of a file are needed to meet the acceptable guidelines for long-term storage of data on endpoint nodes. A suitable formula may be represented by the following equation:

$$y = ceil(x/((x/a)+b)) + c$$

where y represents the ideal number of replicas to request from the endpoints, x represents the number of endpoint nodes available, a represents the target number of endpoints that the equation seeks to deploy in the system, b represents the growth speed factor where a larger number requires a higher number of nodes before the target number of endpoints (a) is reached, and c represents the additional server margin to allow the minimum number of replicas on endpoints to be increased to accommodate low numbers of endpoint replicas at higher growth speed factors b, with the actual maximum number of replicas requested to endpoints equaling a+c. The RDS system may be implemented may use other formulas such as based on a constant number of endpoint nodes, rate of access to the data (e.g., changing dynamic number), and so on.

The geo-scale smart reflection routing is defined as the method in which a gateway node determines which endpoint node to reflect (redirect) a request towards based on accessibility metrics. The accessibility metric for endpoint node is based on various statistics for the endpoint node such as its internal load, known available bandwidth, and geographic location. The gateway node selects the most accessible endpoint nodes (e.g., top one-third of the endpoint nodes) and selects one of those most accessible endpoint nodes in a round-robin manner. To provide statistics, each endpoint nodes may periodically execute a program to collect and report its statistics to the gateway nodes. The gateway nodes may also collect statistics for an endpoint node such a latency, which depends on the requestor's location. One or more gateway nodes may periodically ping the endpoint nodes to determine latency based on the response to the ping.

Some of the gateway nodes prepare a ranking of the endpoint nodes in a geographic region and publish that ranking. Since different gateway nodes may have different rankings, the gateway nodes employ a consensus algorithm to arrive at a final ranking. The rankings are published (e.g., stored at a central location or at the fastest nodes in a region in a decentralized manner). Each gateway node can then revise its ranking to add (or remove) endpoint nodes that are highly (or not highly rated) across ranking. As each ranking is proposed by a gateway node, the other gateway nodes decide whether to accept this ranking or not based on its similarity to own ranking. When a majority of gateway nodes have accepted a ranking, the gateway nodes use this ranking until new consensus is arrived at. The ranking may be a per region (e.g., continent) ranking or global ranking. Each gateway node may employ a different increment for selecting the endpoint nodes in a round-robin manner. For example, one endpoint node may employ an increment of one, another endpoint node may employ an increment of three, another endpoint node may employ an increment of negative two (e.g., increment in reverse order), and so on.

The computing systems (e.g., network nodes or collections of network nodes) on which the RDS system may be implemented may include a central processing unit, input devices, output devices (e.g., display devices and speakers), storage devices (e.g., memory and disk drives), network interfaces, graphics processing units, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems may include desktop computers, laptops, tablets, e-readers, personal digital assistants, smartphones, gaming devices, servers, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on them or may be encoded with computer-executable instructions or logic that implements the RDS system. The data transmission media are used for transmitting data via transitory, propagating signals or carrier waves (e.g., electromagnetism) via a wired or wireless connection. The computing systems may include a secure crypto-processor as part of a central processing unit for generating and securely storing keys and for encrypting and decrypting data using the keys.

The RDS system may be described in the general context of computer-executable instructions, such as program modules and components, executed by one or more computers, processors, or other devices. Generally, program modules or components include routines, programs, objects, data structures, and so on that perform tasks or implement data types of the RDS system. Typically, the functionality of the program modules may be combined or distributed as desired in various examples. Aspects of the RDS system may be implemented in hardware using, for example, an application-specific integrated circuit ("ASIC") or field programmable gate array ("FPGA").

Figure 7:
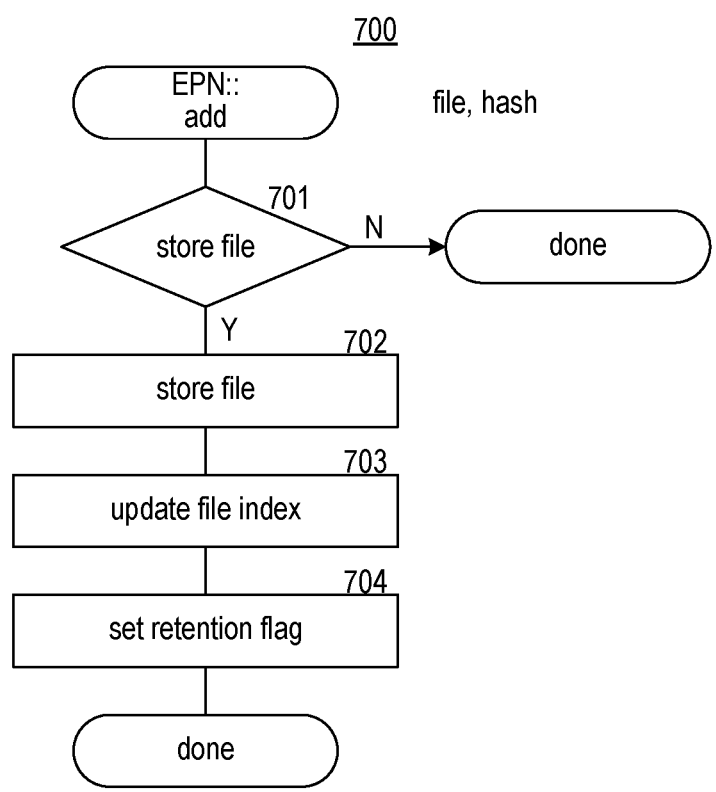
FIG. 7 is a flow diagram that illustrates the processing of an add component of an endpoint node in some embodiments.

FIG. 7 is a flow diagram that illustrates the processing of an add component of an endpoint node in some embodiments. The add component 700 is invoked when an endpoint node receives a request from a gateway node to store a file. In decision block 701, if the endpoint node decides to store the file, then the component continues at block 702, else the component completes. In block 702, the component stores the file locally. In block 703, the component updates a file index that maps the hash to the file. In block 701, the component sets a retention flag for the file and then completes.

Figure 8:
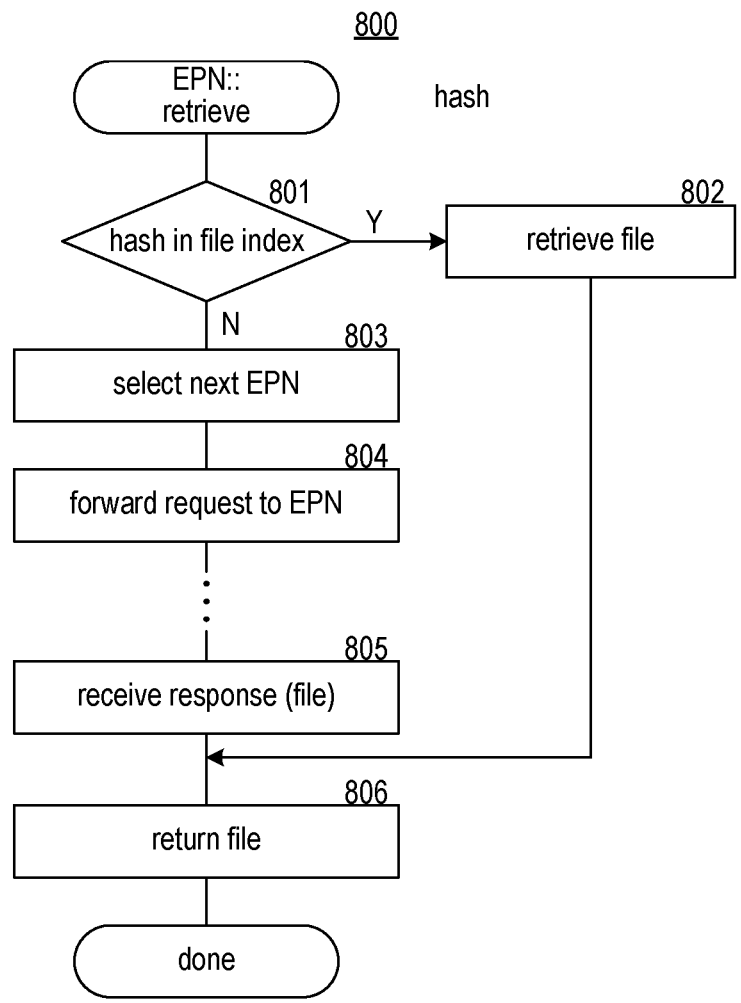
FIG. 8 is a flow diagram that illustrates the processing of a retrieve component of an endpoint node in some embodiments.

FIG. 8 is a flow diagram that illustrates the processing of a retrieve component of an endpoint node in some embodiments. The retrieve component 800 is invoked to retrieve a file that is identified by its hash. In decision block 801, if the hash is in the file index, then the component continues at block 802, else the component continues at block 803. In block 802, the component retrieves the file and continues at block 806. In block 803, the component selects a next endpoint node. In block 804, the component forwards the request to the next endpoint node. In block 805, the component eventually receives the file from the next endpoint node. In block 806, the component returns the file and then completes.

Figure 9:
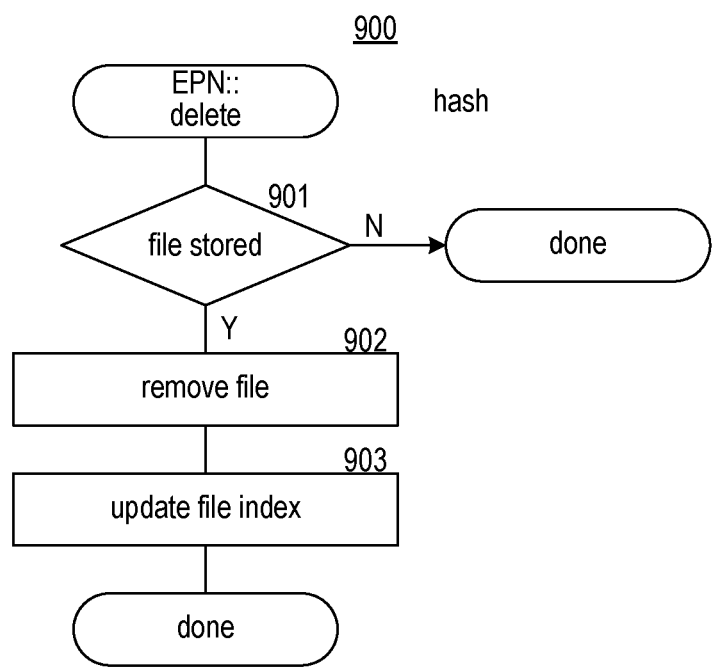
FIG. 9 is a flow diagram that illustrates the processing of a delete component of an endpoint node in some embodiments.

FIG. 9 is a flow diagram that illustrates the processing of a delete component of an endpoint node in some embodiments. The delete component 900 deletes a file identified by a hash. In decision block 901, if the file is stored at the endpoint node, then the component continues at block 902, else the component completes. In block 902, the component deletes the file. In block 903, the component updates the file index to indicate that the file has been deleted. The deletion of file and updating of the index may be performed by initially removing a retention flag for the file and subsequently performing a garbage collection process to delete files that no longer have a retention flag.

Figure 10:
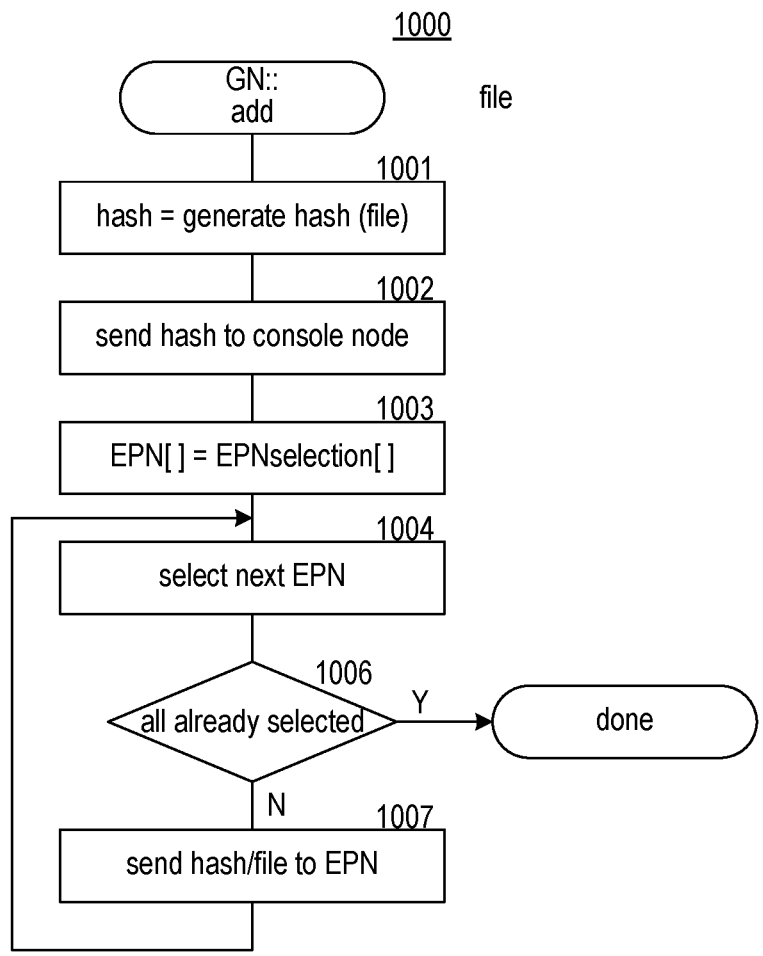
FIG. 10 is a flow diagram that illustrates the processing of an add component of a gateway node in some embodiments.

FIG. 10 is a flow diagram that illustrates the processing of an add component of a gateway node in some embodiments. The add component 1000 directs the storing of a file that is provided to it. In block 1001, the component generates a hash of the file. In block 1002, the component sends the hash to the console node that requested to add the file. In block 1003, the component selects a set of endpoint nodes to store the file. In block 1004, the component selects the next endpoint node. In decision block 1006, if all the endpoint nodes of the set have already been selected, then the component completes, else the component continues at block 1007. In block 1007, the component sends the hash and the file to the endpoint node and then loops to block 1004 to select the next endpoint node.

Figure 11:
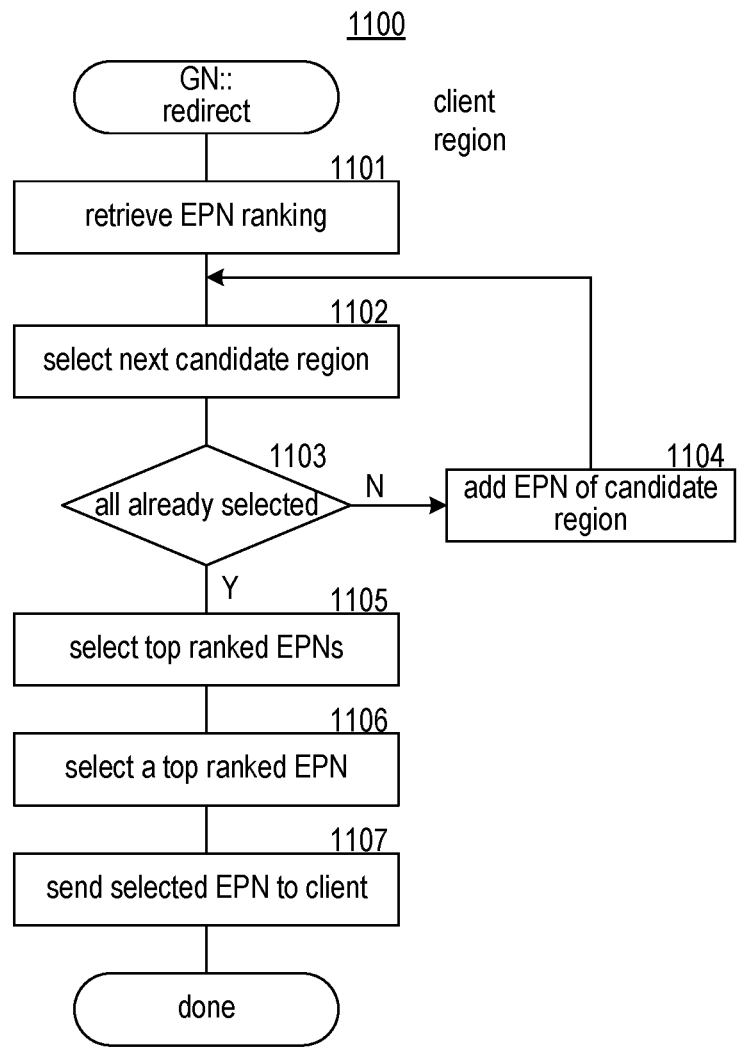
FIG. 11 is a flow diagram that illustrates the processing of a redirect component of a gateway node in some embodiments.

FIG. 11 is a flow diagram that illustrates the processing of a redirect component of a gateway node in some embodiments. The redirect component 1100 is passed a client region where the client is located and then selects an endpoint node to redirect an access to. In block 1101, the component retrieves an endpoint node ranking. In blocks 1102-1104, the component loops identifying candidate endpoint nodes. In block 1102, the component selects the next candidate region for the client region. In decision block 1103, if the candidate regions have already been selected, then the component continues at block 1105, else the component continues at block 1104. In block 1104, the component adds the endpoint nodes of that candidate region to a collection of candidate endpoint nodes and then loops to block 1102 to select the next candidate region. Each region may have associated candidate regions to where requests from clients in that region are redirected. For example, a North American region may have candidate regions of North America, South America, and Europe. When a request to redirect is received from a client in the North American region, the component may redirect the request to any endpoint node in North America, South America, or Europe. In block 1105, the component selects the top ranked endpoint nodes. In block 1106, the component selects one of the top-ranked endpoint nodes in a round-robin manner. In block 1107, the component sends an indication of the selected endpoint node to the client and completes.

Figure 12:
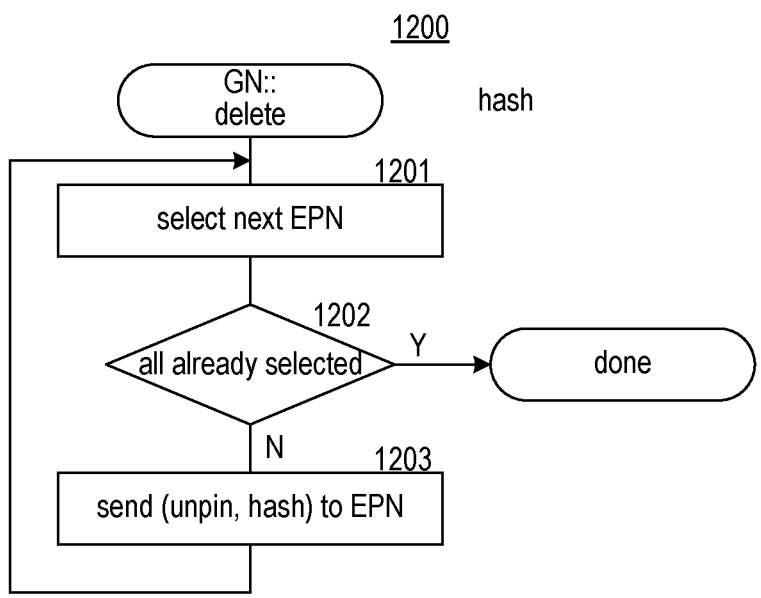
FIG. 12 is a flow diagram that illustrates the processing of a delete component of a gateway node in some embodiments.

FIG. 12 is a flow diagram that illustrates the processing of a delete component of a gateway node in some embodiments. The delete component 1200 is invoked when a request is received by gateway node to delete a file that is identified by a hash. In block 1201, the component selects the next endpoint node. In decision block 1202, if all the endpoint nodes in the RDS system have already been selected, then the component completes, else the component continues at block 1203. In block 1203, the component sends a unpin instruction to unpin (clear the retention flag of) the file identified by the hash to the selected endpoint node and loops to block 1201 to select the next endpoint note.

The following paragraphs describe various embodiments of aspects of the RDS system. An implementation of the RDS system may employ any combination of the embodiments. The processing described below may be performed by a computing device with a processor that executes computer-executable instructions stored on a computer-readable storage medium that implements the RDS system.

In some embodiments, one or more computing systems for providing distributed storage of data. The one or more computing systems comprise one or more computer-readable storage mediums for storing computer-executable instructions and one or more processors for executing the computer-executable instructions stored in the one or more computer-readable storage mediums. The instructions include instructions of endpoint nodes, gateway nodes, and one or more gateway name servers. The one or more gateway name servers receive from clients resolution requests to resolve to a gateway node and resolve the resolution requests to a gateway node address of a gateway node. The gateway nodes form a mesh of gateway nodes that receive from clients requests to access an endpoint node and redirect the requests to endpoint nodes, each retrieval request is received by a gateway node whose address was resolved to by a gateway name server. The endpoint nodes receive from a client a retrieval request to retrieve data based on being redirected to an endpoint node by a gateway node; when a retrieval request is received and the endpoint node stores the data, the endpoint node sends the data to the client; and when a retrieval request is received and the endpoint node does not store the data, the endpoint node forwards the retrieval request to another endpoint node. In some embodiments, a retrieval request identifies data by a hash of the data. In some embodiments, when an endpoint node that forwards a retrieval request, the endpoint node receives the data from the other endpoint node and sends the data to the client. In some embodiments, a gateway node identifies a ranking of endpoint nodes based on accessibility and redirects accesses based on the ranking. In some embodiments, n the accesses are redirected in a round-robin manner among highest-ranking endpoint nodes. In some embodiments, a gateway node receives from a client a store request to store data and requests a subset of the endpoint nodes to store data. In some embodiments, 7 a gateway node received a delete request to delete data and requests each endpoint node to delete the data. In some embodiments, a console node enforces permissions of clients to store and delete data. In some embodiments, the gateway name servers resolve to gateway nodes in a round-robin manner. In some embodiments, the computer-executable instructions further include instructions of a navigation directory wherein the navigation directory maps a client data identifier to an endpoint node data identifier that is used by an endpoint node to identify data. In some embodiments, the gateway nodes form a self-healing mesh.

In some embodiments, a method performed by one or more computing systems of one or more gateway nodes that provide access to endpoint nodes that provide access to files stored by endpoint nodes. When a request is received to store a file, the method generates hash of the file; selects selecting a subset of endpoint nodes; and sends to the selected endpoint nodes a request to store the file along with a hash of the file. When a request is received to delete a file identified by a hash, the method sends to each endpoint node a request to delete the file identified by the hash. When a request is received to redirect an access to an endpoint node, the method selects an endpoint node; and redirects he access to the selected endpoint node. In some embodiments, the selecting of an endpoint node is based on a round-robin selection of endpoint nodes. In some embodiments, the round-robin selection is from endpoint nodes that are highly ranked based on their accessibility. In some embodiments, a ranking of endpoint nodes is determined by consensus of gateway nodes.

In some embodiments, a method performed by one or more computing systems of an endpoint node that stores files of a distributed storage system. The method receives retrieval requests to retrieve files identified by hashes, each retrieval request being redirected to the endpoint node by a gateway node, the gateway node being identified by a gateway domain name system; determines determining whether the files are stored at the endpoint node based on hashes of the files; when a file is stored at the endpoint node, provides the file in response to the retrieve request; and when a file is not stored at the endpoint node, forwards the request to another endpoint node; receives the file from the other endpoint node; stores the file at the endpoint node; and provides the file in response to the retrieve request. In some embodiments, the method receives from a gateway node a request to store a file identified by a hash and storing the file locally. In some embodiments, the method receives from a gateway node a request to delete a file identified by a hash and deleting a local copy of the file. In some embodiments, a file has a retention flag and further comprising deleting local copies of file whose retention flag indicates that the file need not be retained. In some embodiments, a gateway node redirects to an endpoint node based on a ranking of accessibility of the endpoint nodes.

In some embodiments, one or more computing systems for load balancing requests to access gateway nodes that redirect access requests to endpoint node. The one or more computing systems include one or more computer-readable storage mediums for storing computer-executable instructions and one or more processors for executing the computer-executable instructions stored in the one or more computer-readable storage mediums. The instruction include instructions of a plurality of gateway nodes that form a mesh of gateway nodes that receive from clients requests to access an endpoint node and redirect the requests to endpoint nodes, each retrieval request is received by a gateway node whose address is resolved to by a gateway name server; and one or more gateway name servers receive from clients resolution requests to resolve to a gateway node and resolve the resolution requests to a gateway node address of a gateway node, the gateway name server maintains a list of gateway nodes and selects a gateway node from the list. In some embodiments, the gateway name servers select gateway nodes from the list in a round-robin manner. In some embodiments, the computer-executable instructions include instructions of a directory name server that receives requests to access of resource identified by a first resource identifier, resolves the resource identifier to a second resource identifier with a gateway name server as a host, and sends the second resource identifier to the client and instructions of a gateway name server that resolves the second resource identifier a third resource identifier with a gateway node as the host. In some embodiments, the resource identifiers are hypertext transport protocol (HTTP) uniform resource locators. In some embodiments, wherein the resources are selected from a group consisting of a file, a web page, and compute resources.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. One or more computing systems for providing distributed storage of data, the one or more computing systems comprising:
   one or more computer-readable storage mediums for storing computer-executable instructions of:
   endpoint nodes, gateway nodes, and one or more gateway name servers, wherein:
      the one or more gateway name servers receive resolution requests from clients to resolve to a node address of one of said gateway nodes;
      the gateway nodes form a mesh of gateway nodes that receive retrieval requests from clients to access one of said endpoint nodes and redirect the retrieval requests to said endpoint nodes, each retrieval request being received by said one of said gateway nodes whose node address was resolved to by the one or more gateway name servers;
      the endpoint nodes:
         receive a data retrieval request from a client based on being redirected thereto by said one of said gateway nodes;
         upon receipt of the data retrieval request, sends the data to the client if a determination is made that the data is stored locally; and
         upon receipt of the data retrieval request, forwards the retrieval request to another endpoint node if a determination is made that the data is not stored locally; and
   one or more processors for executing the computer-executable instructions stored in the one or more computer-readable storage mediums.

2. The one or more computing systems of claim 1 wherein a data retrieval request identifies data by a hash of the data.

3. The one or more computing systems of claim 1 wherein when an endpoint node that forwards a data retrieval request, the endpoint node receives the data from the other endpoint node and sends the data to the client.

4. The one or more computing systems of claim 1 wherein a gateway node identifies a ranking of endpoint nodes based on accessibility and redirects accesses based on the ranking.

5. The one or more computing systems of claim 4 wherein the accesses are redirected in a round-robin manner among highest-ranking endpoint nodes.

6. The one or more computing systems of claim 1 wherein a gateway node receives from a client a store request to store data and requests a subset of the endpoint nodes to store data.

7. The one or more computing systems of claim 1 wherein a gateway node received a delete request to delete data and requests each endpoint node to delete the data.

8. The one or more computing systems of claim 1 wherein a console node enforces permissions of clients to store and delete data.

9. The one or more computing systems of claim 1 wherein the gateway name servers resolve to gateway nodes in a round-robin manner.

10. The one or more computing systems of claim 1 wherein the computer-executable instructions further include instructions of a navigation directory wherein the navigation directory maps a client data identifier to an endpoint node data identifier that is used by an endpoint node to identify data.

11. The one or more computing systems of claim 1 wherein the gateway nodes form a self-healing mesh.

12. A method performed by one or more computing systems of one or more gateway nodes that provide access to endpoint nodes that provide access to files stored by endpoint nodes, the method comprising:
   when a request is received to store a file:
      generating a hash of the file;
      selecting a subset of said endpoint nodes based on a round-robin selection of endpoint nodes that are highly ranked based on their accessibility, wherein ranking of said endpoint nodes is determined by consensus of said one or more gateway nodes; and
      sending to the selected subset of said endpoint nodes a request to store the file along with a hash of the file; and when a request is received to delete a file identified by a hash,
sending to each of said endpoint nodes a request to delete the file identified by the hash; and
when a request is received to redirect an access to a respective endpoint node:
selecting the respective endpoint node; and
redirecting the access to the respective endpoint node.

13. A method performed by one or more computing systems of an endpoint node that stores files of a distributed storage system, the method comprising:
receiving retrieval requests to retrieve at least one file identified by at least one hash, each retrieval request being redirected to the endpoint node by a gateway node, the gateway node being identified by a gateway domain name system;
determining whether the at least one file is stored at the endpoint node based on said at least one hash of the at least one file;
when a file is stored at the endpoint node, providing the file in response to the retrieve request; and
when a file is not stored at the endpoint node;
forwarding the request to another endpoint node;
receiving the file from the another endpoint node;
storing the file at the endpoint node; and
providing the file in response to the retrieve request.

14. The method of claim 13 further comprising receiving from the gateway node a request to store the at least one file and storing the at least one file locally.

15. The method of claim 14 further comprising receiving from a gateway node a request to delete the at least one file and deleting a local copy of the at least one file.

16. The method of claim 13 wherein the at least one file has a retention flag and further comprising deleting local copies of the at least one file whose retention flag indicates that the at least one file need not be retained.

17. The method of claim 13 wherein the gateway node redirects to the endpoint node based on a ranking of accessibility of the endpoint nodes.

* * * * *